United States Patent

[11] 3,604,461

| [72] | Inventor | Richard A. Matthews<br>Chagrin Falls, Ohio |
|---|---|---|
| [21] | Appl. No. | 30,265 |
| [22] | Filed | Apr. 20, 1970 |
| [45] | Patented | Sept. 14, 1971 |
| [73] | Assignee | Samuel Moore and Company<br>Mantua, Ohio<br>Continuation of application Ser. No. 639,040, Nov. 30, 1970, now abandoned, which is a continuation of application Ser. No. 509,514, Nov. 24, 1965, now abandoned, which is a continuation of application Ser. No. 509,530, Nov. 24, 1965, now abandoned. |

[54] COMPOSITE TUBING
11 Claims, 7 Drawing Figs.

[52] U.S. Cl. ........................................ 138/137,
138/129, 138/130, 138/141, 138/125
[51] Int. Cl. .......................................... F16l 11/04,
F16l 11/08
[50] Field of Search ........................... 138/130–133,
137, 141, 140, 123–125

[56] References Cited
UNITED STATES PATENTS

| 935,086 | 9/1909 | Baird .................... | 138/119 |
| 940,779 | 11/1909 | Subers .................. | 138/130 |
| 1,010,088 | 11/1911 | Subers .................. | 138/130 |
| 2,747,616 | 5/1956 | De Ganahl .............. | 138/130 |
| 2,899,982 | 8/1959 | Harpfer ................. | 138/137 |
| 2,969,812 | 1/1961 | De Ganahl .............. | 285/291 |
| 3,117,597 | 1/1964 | Fritz .................... | 138/125 |
| 3,123,102 | 3/1964 | Frieder ................. | 138/125 |
| 3,159,183 | 12/1964 | Brumbach ............... | 138/125 |
| 3,245,431 | 4/1966 | Coe ...................... | 138/125 |
| 3,266,527 | 8/1966 | Ross ..................... | 138/125 |

FOREIGN PATENTS

315,798 3/1934 Italy

*Primary Examiner*—Herbert F. Ross
*Attorney*—Teare, Teare & Sammon

ABSTRACT: A composite tubing product for high-pressure fluid transmission having an inner core tube made from a flexible polymeric material, a flexible reinforcement member disposed around the core tube and including a plurality of coplanar layers of fibrous strands disposed helically with respect to the core tube, and a flexible outer polymeric sheath disposed around the reinforcement member and providing a protective cover therefor.

PATENTED SEP 14 1971 3,604,461

*INVENTOR.*
RICHARD A. MATTHEWS
BY
Teare, Teare & Sammon

ATTORNEYS

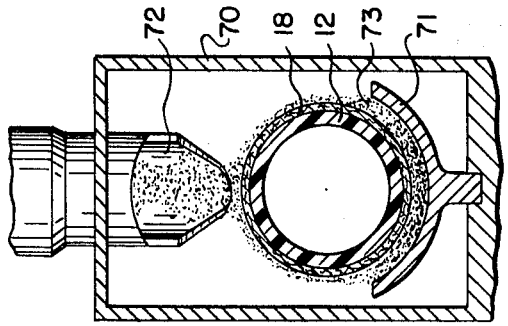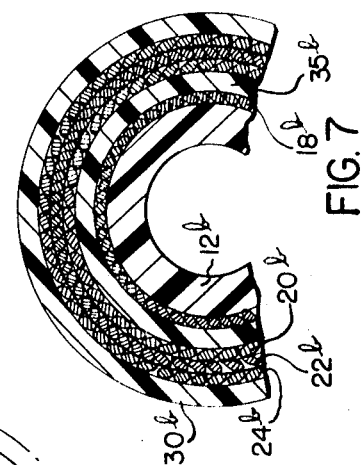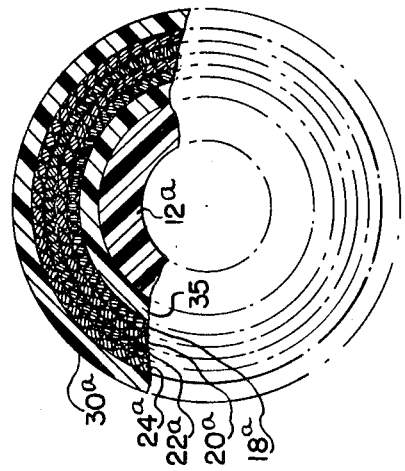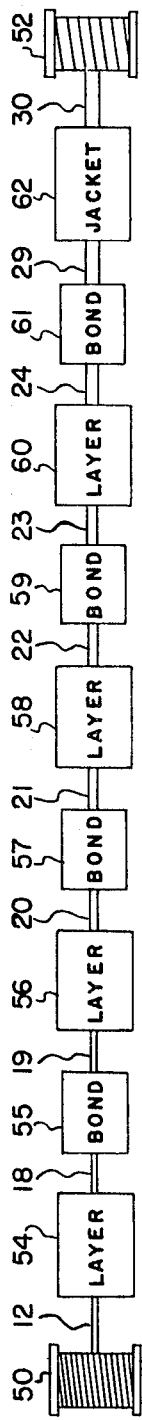

COMPOSITE TUBING

CROSS-REFERENCES TO RELATED APPLICATIONS

This application is a continuation of copending application to Richard A. Matthews, Ser. No. 639,040, filed Nov. 30, 1970, now abandoned, which is a continuation of the copending applications to Richard A. Matthews, Ser. Nos. 509,514 and 509,530, both filed Nov. 24, 1965, now abandoned.

The present invention relates generally to composite tubing and more particularly relates to a multiple layer composite tubing product for high-pressure fluid transmission.

A continuing problem has existed in the industry, in attempting to achieve a high-pressure hose which could transmit a fluid under high pressure without bursting, while still making the product economical to produce.

Heretofore, it has been known to produce high-pressure tubing or hose by covering an extruded plastic fluid transmission tube or core with a single and/or multiple layers of woven or braided fibrous textile materials. The woven or braided arrangements lacked optimum reinforcement characteristics, and often tore during high pressure operations.

One approach was to make a reinforcement sheath of woven fibers disposed circumferentially about a polymeric inner tube. The weaving of the fibers about the tube was a complex operation, and the weaving process necessitated a limitation in the speed of preparation of the product. Moreover, the fiber exhibited a tendency to cross over as a result of excessive tension in applying it to the tube. In addition, in order that the woven sheath be of minimum thickness and cover properly, it was necessary to utilize fibers having a minimum or no substantial twist at the point of crossover in the weaving process. Such minimum twist fibers were difficult to handle and resulted in variations in hose properties.

More recently, efforts have been made to thermally and/or chemically bond such woven or braided fibrous layer and/or layers into tight engagement with the inner plastic tube or core allowing layers remote from the core to be loose. Such construction does not provide the necessary flexural fatigue resistant characteristics under a wide range of temperature and pressure conditions. Furthermore, such tight bond between the inner tube and the woven or braided construction with slippage of the fibers within the braided reinforcement is not satisfactory when used for the transmission of fluid under pressure as tearing or excessive slippage of the fibers occurred thereby causing loss of fatigue resistance.

Another approach was to use metallic wire reinforcement, but this limited the fatigue resistance of the product.

Accordingly, an object of the present invention is to provide an improved construction of a composite tubing product which effectively overcomes the aforementioned and other related disadvantages of such heretofore known woven or braided tubing arrangements.

Another object of the present invention is to produce a reinforcement layer in a more efficient and economical manner while achieving greater burst pressure in multiple layers.

A further object is to provide a fibrous reinforcement layer having the desired reinforcement characteristics, but with minimum thickness.

A further object is to produce a fibrous reinforcement which will not only be thinner when the hose is in its relaxed state, but which will also have a decreased diametrical expansion when the hose is subjected to high-pressures during transmission of a fluid under high-pressure conditions.

A further object is to provide a reinforcement layer wherein the amount of prestressing and tension in applying the fiber to the tube is reduced thereby decreasing the reduction of area of the tube and increasing the life of the tubing product.

A further object is to permit the use of a twisted fiber, while still maintaining minimum thickness of the reinforcement sheath. An additional object is to use a twisted strand arrangement which is more readily available than the nontwisted kind and which is easier to handle.

Another object of the present invention is to provide a multiple layer composite tubing product having improved burst strength, flexibility, abrasion, and fatigue resistant characteristics.

A further object of the present invention is to provide a multiple layer composite tubing product which incorporates optimum dimensional stability characteristics for high-pressure fluid transmission, and which effectively improves fatigue resistance.

The foregoing objects are accomplished in another form by providing a composite tubing product of the character described which includes a polymeric inner fluid transmission tube, several layers of coplanar strands of fibrous material bonded to each other and movable relative to the inner tube, and an outer protective member covering and bonded to said coplanar fibrous layers for movement, as a unit, therewith, relative to said inner tube.

Other objects and advantages of the present invention will be apparent from the following description taken in conjunction with the accompanying drawings wherein:

FIG. 4 is a fragmentary vertical cross section taken along the plane of 4—4 of FIG. 3;

FIG. 5 is a diagrammatic illustration of a method of making the composite tubing product in accordance with the present invention;

FIG. 6 is a fragmentary, cross-sectional view illustrating the internal construction at the bonding station shown in FIG. 5 for applying an adhesive material to the respective layers of the tubing product; and FIG. 7 is a fragmentary vertical cross section showing a still further modification.

In accordance with the present invention, a reinforced high-pressure tube for conveying fluids is provided having improved burst characteristics, minimum thickness, greater durability and which is easier to produce compared to prior woven or braided construction.

Figure 1:
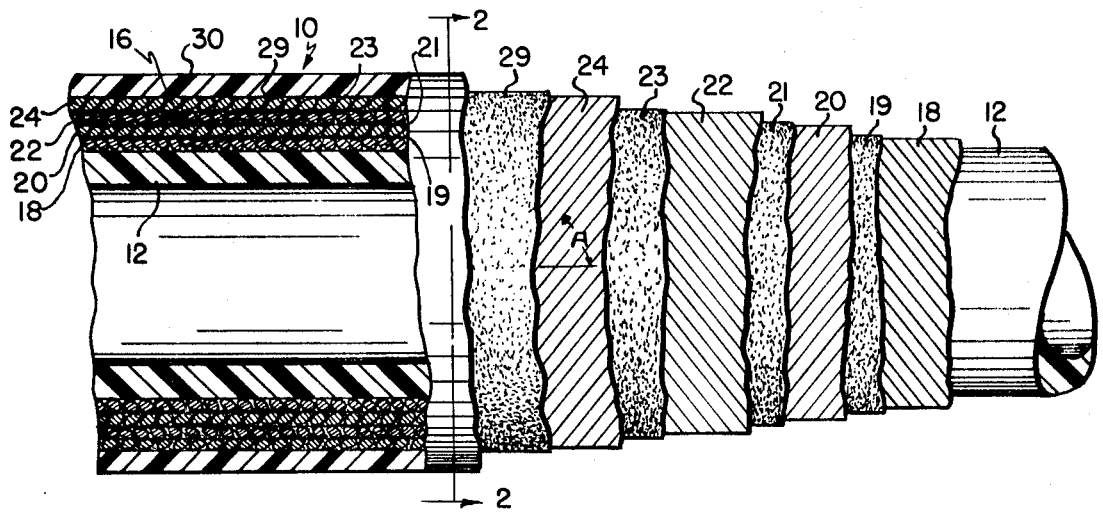
FIG. 1 is a fragmentary, partially sectioned and partially broken away side elevation view of another form of a composite tubing product made in accordance with the present invention.
Figure 2:
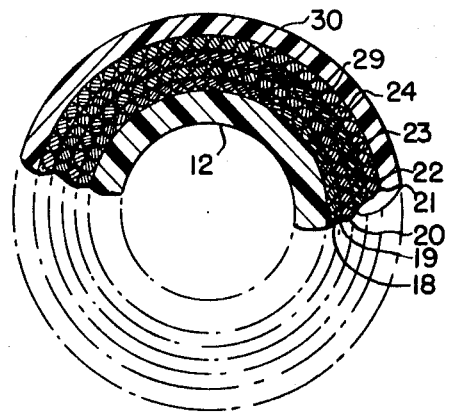
FIG. 2 is a vertical section view taken along the plane of line 2—2 of FIG. 1.

In accordance with an object of the present invention to produce a high pressure hose which can slip at the core, but be tightly bound at the periphery, and which has high burst strength, flexibility, and durability, and good stability at the couplings, a preferred form of the invention is shown in FIGS. 1 and 2 hereof. Such structure includes a relatively thin-walled inner tube or core 12 which provides a passageway for the transmission of the fluid therethrough. The inner tube 12 may be made of any suitable high strength polymeric material, such as nylon, polyurethane and polyolefin, particularly of the high density polyethylene types and those polyolefins having a melt index range of 0.1 to 10.

A reinforcement sleeve shown generally at 16 is disposed in circumferential surrounding relation relative to the inner tube 12. Such reinforcement sleeve 16 is comprises of at least one, and preferably a plurality of circumferential superimposed layers 18, 20, 22 and 24 of fibrous material. In accordance with the present invention, each of the layers 18, 20, 22 and 24 of the reinforcement sleeve 16 preferably comprises a series of spirally wound, laterally contiguous synthetic fiber strands which provide the respective coplanar layers illustrated and each is applied under a tension of about one pound. Preferably, each strand turn in a respective layer is bonded to an associated adjacent strand turn while each of the respective coplanar layers 18, 20, 22 and 24 themselves are secured to an associated one of the other superimposed coplanar layers, as at 19, 21 and 23 by means of a suitable bonding material. It is to be noted, however, that in the preferred embodiment illustrated in FIGS. 1 and 2, the innermost coplanar layer 18, is not bonded to the inner tube 12 for the purposes and advantages as will hereinafter be more fully described.

In accordance with the present invention, the fibrous strands that provide the reinforcement sleeve 16 are preferably composed of poly (alkylene terephthalate) ester fiber and more specifically poly (ethylene terephthalate) ester fiber commonly available under the name "DACRON." DACRON, a trademark, is a synthetic polyester fiber produced by the condensation of terephthalic acid and ethylene glycol. It is to be understood, however, that other suitable materials may be used for the fiber strands, such as nylon, or regenerated cellulose or like materials. Where the strand fibers are made of polyethylene terephthalate ester, a preferred bonding agent is ADIPRENE L-100, a trade name of a polyurethane prepolymer sold by the E. I. du Pont Company.

The reinforcement sleeve 16 is preferably covered by an outer circumferentially disposed protective sheath 30, having a wall thickness of about 0.030 inch.

The composition of the outer protective sheath 30 may vary dependent upon such factors as the chemical and weathering resistance required for a particular application of the tubing product. It has been found that polyurethanes exhibit preferred results for the outer sheath. Also satisfactory, are plasticized nylons which may be employed when maximum solvent resistance is required; while polyolefins and vinyls may be employed for good weathering resistance and solvent resistance.

The protective sheath 30 is tightly bonded to the reinforcement sleeve 16, as at 29, by means of a suitable elastomeric polymeric material, such as polyurethane or the like. By this arrangement, the respective coplanar layers 18, 20, 22 and 24 which comprise the reinforcement sleeve 16 are conjointly bonded to each other and also to the outer protective sheath 30 so as to move axially, as a unit, relative to the inner tube 12. Moreover, it can be seen that by this arrangement, a strong interfacial bonding is achieved between the respective coplanar fibrous layers of the reinforcement sleeve 16 in addition to a strong bond at the interface between the reinforcement sleeve 16 and the outer protective sheath 30, but without any bonding securement between the protective sleeve 16 and the inner tube 12. Such arrangement, provides an axial slippage between the outer face of the inner tube 12 and the protective sleeve 16 and thus provides better fatigue resistance from flexing in high-pressure fluid transmission. This slippage construction enables a predetermined slight shifting movement of the inner tube 12 which provides an effective shock-absorbing action.

The wall thickness of the inner tube 12 will vary for a given internal diameter, but for a 1-inch tube the optimum thickness is between 0.070 inch and 0.080 inch, the larger being used wherever increased strength is desired.

In order to maximize the flexibility characteristics of the composite tubing product illustrated in FIGS. 1 and z, it is preferred that the bonding agent or adhesive for securement of the coplanar fibrous layers be of an elastomeric or flexible nature. By such bonding, control of the degree of movement is provided in the respective coplanar fibrous layers which serves to absorb the shock effects from high-pressure fluid transmission while holding the fibers in tight bonded relationship. Moreover, it is preferred that a bonding agent be selected which is capable of providing a strong bond between the respective coplanar fibrous layers of the reinforcement sleeve 16 and between the reinforcement sleeve and the outer protective sheath 30, but which has substantially no bonding affinity for the inner tube 12 in order to achieve the necessary slippage characteristics, as aforesaid.

As best shown in FIGS. 1 and 2, the strand turns of the coplanar fibrous layers 18, 20, 22 and 24 of the reinforcement sleeve 16 are preferably spirally wound so as to be in contiguous side-by-side engagement with each other along a substantial portion of the outer peripheral surface of the inner tube 12. Such contiguous side-by-side relationship of the strands comprising the respective coplanar layers provides an effective barrier to prevent the intersticial migration of the bonding agent applied to the respective layers, and therefore, effectively prevents movement of the bonding material into engagement with the inner tube 12. Such barrier construction, enables bonding agents which may even have an affinity for bonding the fibrous material to the inner tube 12 to be satisfactorily employed without impairing the aforesaid slippage characteristics of the composite tubing product. In some instances, there may result, such as when there exists a slight space or depth between adjacent strand turns during fabrication or the like, that minute amounts of bonding material may migrate through the coplanar fibrous layer and into engagement with the inner tube 12, but such sporadic migration is generally present over only a small and/or intermittent area which may be readily broken upon bending of the tube without consequential impairment to the slippage characteristics of the tubing product.

In accordance with the present invention, it is preferred that each of the respective coplanar fibrous layers 18, 20, 22 and 24 be wound so that all of the strand turns of one layer are obliquely disposed relative to the strand turns of an adjacent circumferentially disposed layer. This arrangement is best shown in FIG. 1 wherein the respective coplanar fibrous layers 18, 20, 22 and 24 are illustrated as being alternately and obliquely disposed relative to one another. Such arrangement provides improved strength characteristics in the tubing product for the transmission of fluid under pressure. It can be seen that because the circumferentially disposed and superimposed coplanar fibrous layer 20 is obliquely disposed relative to the innermost layer 18, the respective fibers of the outer layer 20 will not slip between the fibers of the inner layer 18 and thereby spread them apart and cause migration of the bonding agent therethrough. Thus, the integrity of the innermost layer 18, as a barrier to prevent migration of the bonding material into contact with the inner tube 12 is maintained.

It is preferred that each strand of fibrous material be comprised of multiple ends of polyester material, such as DACRON, having a denier of about 1100 which have been twisted together to provide the strands. Each end may be composed of many monofilaments. It is preferred to use a strand of between three to eight ends. It is also preferred that the strand turns of each coplanar layer of fibrous material be spirally wound so as to provide an angle (A) of about 50° to 60° relative to the longitudinal central axis of the inner tube 12. In some applications, such as lower pressure or extreme high pressure, angles of 40° to 70° have been useful. In accordance with the present invention, it has been found that such angular disposition of the strands comprising the coplanar fibrous layer provides good strength and flexibility characteristics in the tubing product while preventing bonding migration, as aforesaid.

In FIG. 5 there is diagrammatically illustrated a system for making the composite tubing product in accordance with the present invention. In such method, the inner polymeric tube 12 may be extruded as an integral first step of the process, or, as illustrated in FIG. 9, the inner tube 12 may be extruded at some remote location and then taken up and stored on a reel 50. Conveniently, the inner tube 12 may have a leader portion (not shown) which extends through the various work stations and is attached at one end to a power takeup reel 52. The takeup reel 52 then pulls the inner tube 12 through the various work stations during forming of the composite tubing product. Looking from left to right, at the first work station 54, a plurality of spirally wound turns of the fibrous strands is applied to the inner tube 12 so as to provide the innermost coplanar layer 18 of the reinforcement sleeve 16. The inner tube 12 covered by such first coplanar layer 18 then passes through a bonding station 55 wherein the first layer of bonding material 19 is applied. The inner tube 12 then passes progressively through the successive alternating coplanar layer applying and bonding stations 56 to 61 to complete the build up of the reinforcement sleeve 16. Moreover, it can be seen that the number and/or arrangement of work stations through which the inner tube 12 passes depends upon the number of layers in the reinforcement sleeve for a given application, as desired. Upon completion of the build up of the reinforcement sleeve 16, the inner tube 12 may then be moved through a final bonding station 61 which deposits a bonding agent 29 on the outer peripheral surface of the reinforcement sleeve 16, whereupon at a subsequent work station 62 the outer protective sheath 30 is applied as by extrusion to cover the reinforcement sleeve 16, as aforesaid. Each of the coplanar fibrous layers 18, 20, 22 and 24 of the reinforcement sleeve 16 may be applied to the inner tube 12 by unwinding a single continuous fiber strand onto the tube or may be applied by a multistrand application machine, as desired.

A bonding station, such as the station 55 of FIG. 5, may be constructed as illustrated in FIG. 6. The inner tube 12, having the first coplanar fibrous layer 18 disposed thereon, may be passed through a polygonal boxlike structure 70 having a trough 71 disposed longitudinally therein. A spout 72 is disposed within the boxlike structure 70 immediately above the trough 71 so that the inner tube 12 having the layer 18 thereon may be passed therebetween. Thus, as the inner tube 12 passes through such bonding station, heated bonding material, as at 73, flows, as by gravity, onto the confronting peripheral surface of the inner tube 12 and into the trough 71. The bonding material 19 may be fed to the trough 71 such as by a hopper 80. Moreover, after the application of the adhesive by each bonding structure, such as the one shown in FIG. 6, the tube may be passed through a wiper (not shown) to ensure uniform spreading of the adhesive before the next coplanar fibrous layer is applied.

At the final work station 62, the outer protective sheath 30 is applied to the reinforcement sleeve 17, such as by a suitable taping machine (not shown) which may readily apply the outer sheath to the reinforcement sleeve 16 in the form of a spirally wound tape. It is to be understood, however, that the outer sheath 30 may also be applied to the reinforcement sleeve 16 by other forming techniques, such as extrusion or the like, as known in the art.

Figure 3:
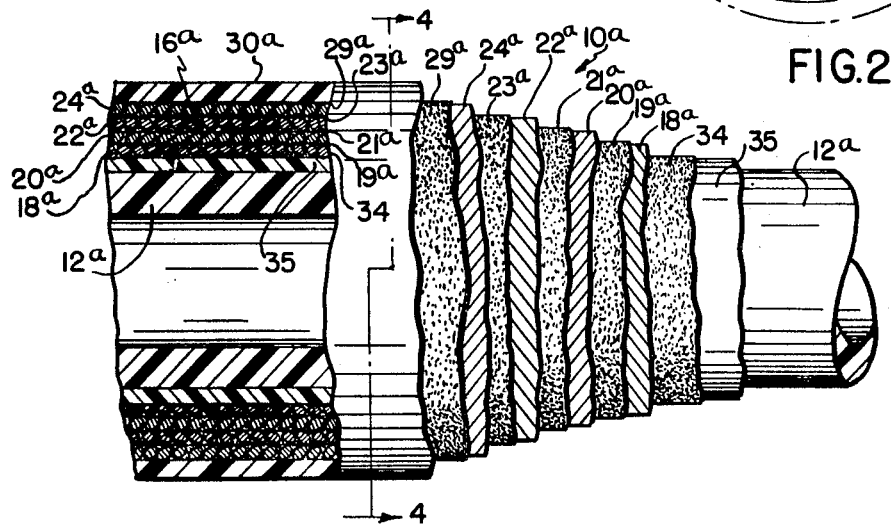
FIG. 3 is a fragmentary, partially sectioned side elevation view of a further modification of the composite tubing product made in accordance with the present invention.

In FIG. 3, there is shown another modification of the composite tubing product 10a wherein like components are illustrated by like reference numerals with the suffix "a" added, except that in this form, a barrier layer 35 is disposed circumferentially between the inner tube 12a and the next adjacent or innermost coplanar fibrous layer 18a of the reinforcement sleeve 16a and bonded thereto by an elastomeric bonding medium as at 34. In this form, the barrier sleeve 35 is comprised of a relatively adhesive impervious and free-sliding material. It is preferred, that such barrier sleeve 35 be comprised of a material, such as MYLAR, which is a trademark of the E. I. du Pont Company in the form of a polyethylene terephthalate polyester film of tough, strong characteristics. Here again, each of the coplanar fibrous layers 18a, 20a, 22a and 24a is secured to each other by an elastomeric bonding agent to from bonding layers 19a, 21a and 23a to provide the reinforcement sleeve 16a. Similarly, an outer protective sheath 30a such as polyurethane, is bonded to the reinforcement sleeve 16a by a bonding layer as at 29a. Moreover, in this form the barrier sleeve 35, while being bonded to the first layer 18a, is not bonded to the inner tube 12. Accordingly, the barrier sleeve 35, reinforcement sleeve 16a and the protective sheath 30a may move axially, as a unit, relative to the inner tube 12a, as aforesaid. By this arrangement, the tubing reinforcement is permitted to slide as a unit thereby reducing the flexural fatigue life of the reinforcement sleeve. One advantage of the use of the structure shown in FIG. 3 is that there is a reduction in the linear stretching of the elastomeric inner core tube as the suction or drag, caused by the placement of the fibers on the tube while the tube is pulled along the assembly line is decreased.

In the barrier sleeve construction of the composite tubing product illustrated in FIG. 3, it is contemplated that one or more woven or braided layers of reinforcement material may be used in lieu of the coplanar spirally wound fibrous construction to achieve some of the beneficial results in accordance with the principles of the present invention. However, it is preferred that such coplanar fibrous layer construction be utilized for the purposes and advantages as aforesaid.

A still further modification may be to place a sleeve between two adjacent coplanar layers. For example, as shown in FIG. 7, a thin sleeve, 35b such as of MYLAR, may be placed between layers 18b and 20b and bonded to one of the layers, such as to layer 18b, while being unbonded to layer 20b and free to slide with respect thereto. The layer 18b may or may not be bonded to the core tube 12b depending on the degree of slippage desired. The aforesaid modification, provides a controlled slippage whereby some of the fibrous coplanar layers, such as layers 20b, 22b and 24b slip as a unit relative to at least one fibrous layer, such as layer 18b, with a bearing surface therebetween. An outer protective jacket 30b may be bonded to the outermost fibrous reinforcement.

It can be seen that where the embodiment of FIG. 3 is utilized, the controlled slippage is obtained by bearing surface sliding past a bearing surface, where the embodiment of FIGS. 1 and 7 are used, a fibrous reinforcement slides relative to a bearing surface to provide the controlled unitary slippage.

From the foregoing description and accompanying drawings, it will be seen that the present invention provides a novel, composite tubing product having improved flexibility and flexural fatigue resistant characteristics, as well as improved burst strength.

I claim:

1. A flexible composite tubing for high-pressure fluid media of uniform construction and properties which effectively absorbs shock during high-pressure fluid transmission by internal movement of its components to provide improved fatigue resistance in high-pressure usage comprising, a thermoplastic, extruded, polymeric inner cope tube;

a nonwoven reinforcement sleeve unit overlying said inner core tube comprised of at least two circumferentially superposed layers of helically wound, laterally contiguous strands of synthetic polymeric fibers, each of said layers generally defining an annular layer which is generally free of interweaving and interwining both with respect to itself and with respect to its adjacent associated layer. The strands of one layer being oppositely wound with respect to the strands of the other layer, the strands within each layer being bonded to each other with a synthetic elastomeric polymeric material, and the two layers being interfacially bonded to each other with a synthetic elastomeric polymeric material to substantially preclude slippage therebetween;

A thermoplastic, polymeric outer sheath generally interfacially bonded to the reinforcement sleeve with a synthetic elastomeric polymeric material to substantially preclude slippage between said outer sheath and said reinforcement sleeve; and the inner core tube being generally free of bonded securement to the reinforcement sleeve to provide slippage between said reinforcement sleeve unit and said inner core tube along the outer face of the inner core tube only, thereby improving resistance to fatigue from flexing during high-pressure fluid transmission.

2. A composite tubing product in accordance with claim 1, wherein the said contiguous relation of said strands is substantially maintained by application of the strands under tension sufficient to generally retard the migration of said bonding material onto said core tube.

3. A composite tubing in accordance with claim 2, wherein said strands are applied under a tension of about 1 pound.

4. A composite tubing in accordance with claim 1, wherein each of said layers is made from a single, continuous strand of twisted fibers, and each being applied helically under tension.

5. A composite tubing in accordance with claim 1, wherein

The angular disposition of the strands in each of said layers relative to the longitudinal central axis of the inner tube is between about 40° to 70°.

6. A composite tubing in accordance with claim 1, wherein in the angular disposition of the strands in each of said layers relative to the longitudinal central axis of the inner tube is between about 50° to 60°.

7. A composite tubing product in accordance with claim 1, wherein
the strands in each of said layers are comprised of a plurality of ends twisted together into a unitary structure.

8. A composite tubing product in accordance with claim 7, wherein
between two to eight ends are twisted together.

9. A composite tubing product in accordance with claim 1, wherein
said inner tube is selected from the group consisting of nylon, polyurethane, and polyolefin.

10. A composite tubing product in accordance with claim 1, wherein
the strands of said reinforcement means are polyethylene terephthalate ester.

11. A composite tubing in accordance with claim 1, wherein
said inner tube is from the group consisting of polyolefins having a melt index range of 0.1 to 10.